United States Patent
Roffman et al.

(10) Patent No.: US 6,830,712 B1
(45) Date of Patent: Dec. 14, 2004

(54) DEFORMABLE MOLDS AND METHODS FOR THEIR USE IN THE MANUFACTURE OF OPHTHALMIC LENSES

(75) Inventors: Jeffrey H. Roffman, Jacksonville, FL (US); Gregory James Hofmann, Jacksonville Beach, FL (US); Larry G. Jones, Jacksonville, FL (US)

(73) Assignee: Johnson & Johnson Vision Care, Inc., Jacksonville, FL (US)

( * ) Notice: Subject to any disclaimer, the term of this patent is extended or adjusted under 35 U.S.C. 154(b) by 671 days.

(21) Appl. No.: 09/649,635

(22) Filed: Aug. 28, 2000

(51) Int. Cl.[7] .................................................. B29D 11/00
(52) U.S. Cl. ........................ 264/1.38; 249/82; 264/2.5; 264/313; 425/808; 700/197
(58) Field of Search ........................ 264/1.1, 2.5, 2.7, 264/1.38, 402, 313, 1.36; 249/116, 82, 117; 425/808, 174; 700/197

(56) References Cited

U.S. PATENT DOCUMENTS

| | | | |
|---|---|---|---|
| 4,277,276 A | 7/1981 | Kellar et al. | 65/106 |
| 4,349,375 A | 9/1982 | Kellar et al. | 65/219 |
| 4,470,835 A | 9/1984 | Fecik et al. | 65/106 |
| 5,702,733 A | 12/1997 | Enami | 425/183 |
| 5,880,896 A | 3/1999 | Ishii et al. | 359/846 |
| 6,086,204 A | 7/2000 | Magnante | 351/212 |

FOREIGN PATENT DOCUMENTS

| EP | 318164 | * 5/1989 |
| JP | 4-284208 | * 10/1992 |

* cited by examiner

Primary Examiner—Mathieu D. Vargot
(74) Attorney, Agent, or Firm—Lois A. Gianneschi

(57) ABSTRACT

The present provides deformable molds and methods for manufacturing ophthalmic lenses using deformable molds. The molds of the invention may be used in the custom manufacture of ophthalmic lenses.

20 Claims, 4 Drawing Sheets

DEFORMABLE MOLDS AND METHODS FOR THEIR USE IN THE MANUFACTURE OF OPHTHALMIC LENSES

FIELD OF THE INVENTION

The present invention relates to the manufacture of ophthalmic lenses. In particular, the invention provides deformable molds and methods for manufacturing ophthalmic lenses using deformable molds.

BACKGROUND OF THE INVENTION

The use of ophthalmic lenses, including spectacle lenses, contact lenses, intraocular lenses, and the like for the correction of ametropia is well known. Production of the lenses requires the use of molds that impart the desired corrective characteristics onto the lens surfaces. Typically, a large inventory of molds is required corresponding to each sphere, add, and cylinder power, and combinations thereof desired for the finished lens. Production and maintenance costs for the mold inventory are high.

One method for production of lenses that attempts to eliminate the need for large inventory molds is disclosed in U.S. Pat. No. 6,026,204. In this patent is disclosed the use of customized, heated dies, which utilize mechanical fingers, alone or in combination with a metal surface, to impart the desired corrective characteristics to a lens blank. This method is disadvantageous in that it is unsuitable for the production of certain ophthalmic lenses, such as soft contact lenses because soft contact lens materials are thermoset materials that cannot be deformed with heat. Additionally, this method is disadvantageous in that molding the lens material using a heated die requires that the lens blanks' optical axis be perfectly aligned with that of the die, which adds a great degree of difficulty to production of the lens. Finally, the disclosed method is not the most cost effective production method in that it is a thermal molding process. Therefore, a need exists for a method to produce ophthalmic lenses with a mold that permits reduction of lens inventory and which overcomes some or all of these disadvantages.

DESCRIPTION OF THE INVENTION AND ITS PREFERRED EMBODIMENTS

Figure 1:
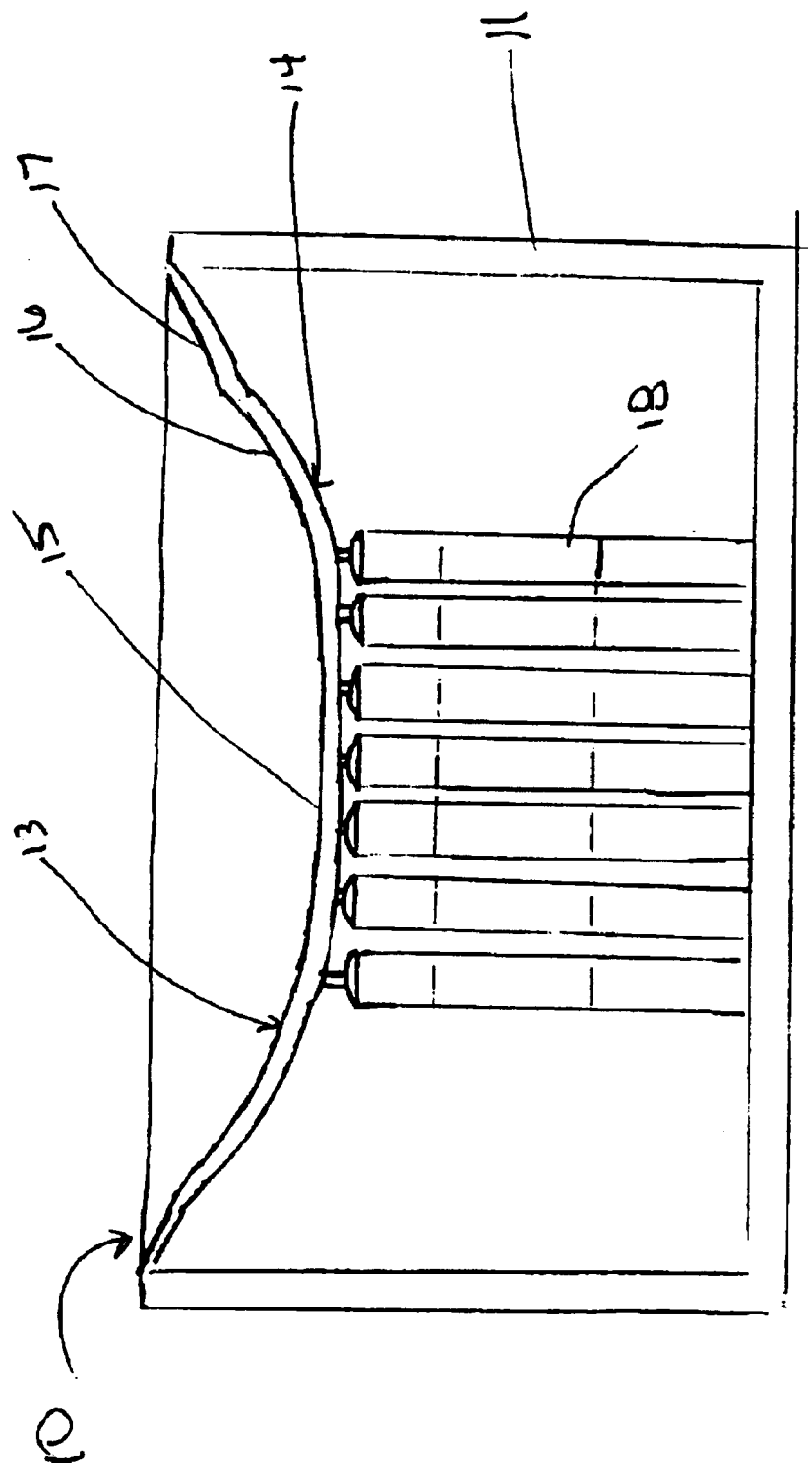
FIG. 1 is a magnified, cross-sectional view of a mold half of a mold the invention.

The present invention provides deformable molds, and methods using the molds, for use in producing ophthalmic lenses. The invention permits the production of a full prescriptive range of lenses while reducing the number of molds required. Further, the molds of the invention may be used in a method for the delivery of customized ophthalmic lenses to a lens wearer.

In one embodiment, the invention provides a mold for use in the manufacture of ophthalmic lenses comprising, consisting essentially of, and consisting of: a.) at least one mold half comprising, consisting essentially of, and consisting of a nonmolding surface and a molding surface, wherein at least a portion of the molding surface is capable of being reversibly deformed; and b.) adjustment means for reversibly deforming the deformable portion of the molding surface. For purposes of the invention, by "ophthalmic lens" is meant a spectacle lens, a contact lens, an intraocular lens, or the like.

The non-molding surface of the mold half is contacted with the adjustment means and the molding surface contacts an ophthalmic lens-forming material. At least a portion of the molding surface is capable of being reversibly deformed and has a first shape that may be of any shape, but conveniently is of a concave or convex shape having a first radius of curvature $R_1$. This deformable portion of the molding surface is capable of being reversibly deformed by action of the adjustment means against the non-molding surface so that the deformable portion assumes a second shape that is desired to be imparted to at least a portion of one surface of the ophthalmic lens to be produced in the mold. The second shape is such that it can impart the desired optical characteristics to the lens.

By "optical characteristics" is meant one or more of spherical, aspheric, toric, or cylindric curvature, and the like and combinations thereof. The optical characteristic imparted will depend on the aberrations of the lens wearer's eye desired to be corrected. The mold of the invention is suitable for producing lenses for correction of any wavefront aberration of the eye, meaning any departure from a spherical wavefront. These aberrations include, without limitation, astigmatism, defocus, coma, spherical aberrations, distortion, and the like. These aberrations also may be defined using Zernike polynomials.

The molding surface may be formed by any material capable of being reversibly deformed, capable of withstanding the stresses imposed by the lens manufacturing process selected, and capable when deformed of maintaining a shape suitable for imparting the desired optical characteristics to the lens surface to be molded. If the lens is to be formed using a ultra-violet or visible light cure, the material preferably is transmissive of light between about 250 and 500 nm. Additionally, the molding surface must be compatible with the material from which the lens is to be molded. Factors for determining whether the mold surface material is compatible include, without limitation, whether the material adheres to the lens-forming material and whether the material chemically reacts with the lens-forming material Suitable molding surface materials include, without limitation, metals, polymers, metalized polymers and the like and combinations thereof Exemplary of these materials are aluminum, gold, brass, and nickel metals, polyolefin polymers including, without limitation, polyethylene and polypropylene, polyethylene terphthalate, silicone polymers, electro-active polymers such as polyanilines, polypyrroles, ion exchange polymer metal matrix compositions and the like, shape-memory polymers such as segmented polyurethanes, ceramics such as silicon carbide, shape-memory alloys such as nitinol, and the like and combinations thereof. These materials are commercially available or methods for their production are known.

The molding surface must have an optical quality surface finish meaning that it is sufficiently smooth so that a lens surface formed by the polymerization of a lens forming material in contact with the molding surface is optically acceptable. The non-molding surface need not have an optical quality finish. However, the non-molding surface must be sufficiently pliant, flexible, and durable to enable its repeated contact, and action upon it by, the adjustment means.

The size, shape, and thickness of the molding surface, singly or in combination with the non-molding surface, will be dependent on the type of lens to be produced. Preferably, the molding surface, singly or in combination with the non-molding surface, is in the form of a membrane, more preferably a polymeric membrane. In a most preferred embodiment, the molding surface is a membrane of a size and shape suitable for production of a soft contact lens and is about 0.5 to about 5000, preferably 1 to about 1000 microns in thickness.

Adjustment means contact the non-molding surface of the mold of the invention under conditions suitable to deform the deformable portion of the molding surface to the desired shape. Adjustment means may be any means capable of manipulating and deforming the deformable portion of the molding surface to the degree necessary to obtain the desired molding surface configuration. Examples of such adjustment means include, without limitation, fluids, micro-actuators, such as piezoelectric, micro-motorized, or hydraulic micro-actuators, magneto-restrictive actuators, electro-static actuators, electro-active polymers, and the like that move in response to an input signal. For example, by varying the voltage applied to a series of piezo-electric micro-actuators, the deformable portion of the molding surface may be displaced so that it assumes a desired shape.

In embodiments in which micro-actuators are used, spacing of the actuators may be determined by the resolution requirement of the lens surface to be formed. The resolution requirements will be determined by the features desired to be imparted onto the lens surface. The adjustment means may be used in combination with heat to alter the molding surface's shape. In this embodiment, heat is used so as to raise the temperature of the molding surface to above its glass transition temperature. The heat may be provided into the mold by any convenient known means. It is preferred that only the adjustment means are used.

As an alternative to the micro-actuators, the adjustment means may be a mechanical magnetic field deformation means. In this embodiment, a first magnetic surface contacts the non-molding surface. Preferably, the magnetic surface is of a shape that is complementary to the non-molding surface. The magnetic surface may be constructed of any magnetic material capable of withstanding the molding process environment and, preferably, is of a material that is capable of being physically or chemically bonded to the non-molding surface. Suitable materials include, without limitation, magnetic ferrous steels, cast or sintered alnicos, bonded or sintered ferrites, lodex, P-6 alloy, cunife, cunico, vicalloy, remalloy, platinum cobalt, cobalt-rare earth blends, and the like and combinations thereof.

A second magnetic surface is brought into sufficient proximity to the first magnetic surface to exert a magnetic force upon the first surface that is effective to impart a desired shape to the first magnetic surface and, through that surface, to the molding surface. The second magnetic surface may be positioned by any convenient positioning means including, without limitation, a robotic arm, a gripper, an adjustable mechanical arm, or the like or a combination thereof. Either or both the first and second magnetic surfaces may be a formed of a series of electromagnets.

Conditions suitable to deform any of the adjustments means used in the invention will depend upon a number of factors. These factors include the type of adjustment means used, the materials selected to form the molding and non-molding surfaces, and the shape desired to be imparted to the lens surface.

In the molds of the invention, input signals to the adjustment means may be, and preferably are, the distortions or aberrations of the eye for which the lens is being manufactured. Clinical wavefront sensors, such as aberroscopes, Hartmann-Shack devices and mirror arrays capable of measuring these aberrations are commercially available. The wavefront data, or measured aberrations, may be represented by a set of mathematical coefficients, such as Zernike coefficients, that may be used to form the input signals that drive the adjustment means. The adjustment means contact a portion or the whole of the non-molding surface and, by action on that surface, deform the deformable portion of the molding surface so that the surface is capable of imparting one or more optical characteristics onto all or a portion of a surface of the lens to be formed within the mold. Configuration of software suitable for processing and inputting the signals for purposes of driving the adjustment means is within the skill of one ordinarily skilled in the art.

The data obtained through the use of the wavefront sensors may be reported in terms of Zernike coefficients. This data then is converted mathematically into an elevation map above and below a designated mean sphere value to obtain the optical path difference. These elevations are then used to determine the shape to be imparted to a surface of the lens. For the manufacture of contact lenses, these elevations preferably will determine the shape of the front or object side surface of the lens.

In addition to optical characteristics, the molding surface may be used to impart a geometry to a back surface of a contact lens that substantially corresponds with that of the lens wearer's cornea. This function of the mold of the invention may find its greatest utility in the manufacture of contact lenses. The corneal topographic data for the lens wearer may be acquired using conventional topographers. The data initially may be applied to a soft contact lens model in an unflexed state and then by taking into account lens flexure when the lens is placed onto the wearer's eye.

For contact lenses, preferably, corneal data it is used to determine the elevation map of the lens' back surface. Mapping of the corneal elevation onto the lens surface may be carried out by any known method. For soft contact lens production, preferably, mapping is carried out so that the error introduced by flexure of the lens is minimized. In this method, the corneal elevation data is applied to a soft contact lens in the unflexed state. The elevation data is then transformed by taking into account lens flexure.

In this method, for practical considerations, it is assumed that the ideal cornea is spherical and that the actual corneal elevations and their best spherical fit are denoted f(x) and g(x), the function g(x) being part of a sphere having radius $R_a$. In general, the radius $R_b$ of an unflexed soft contact lens is spherical and is larger than that of the best spherical fit g(x. The first step is to transform the corneal elevations f(x) into a larger scale for which the best spherical fit will have a radius equal to $R_b$. One approach in simplifying the transformation is to represent the function f(x) in polar coordinates as f(θ). Then using the scale factor $\alpha=R_b/R_a$, the scaled version of the corneal elevation may be expressed as:

$$f^{(1)}(\theta)=\alpha f(\theta)$$

In the second stage, the scaled corneal elevation, f(θ, is scaled down so that the area covered by the soft contact lens corresponds to the area of the cornea. In a two dimensional case, this scaling down is obtained according to the following relationship:

$$f^{(2)}(\theta)=\alpha^{-1}f^{(1)}[(\theta)-\pi/2)/\alpha+\pi/2]+R_b(1-1/\alpha)$$

The mapping transformations given in the above equations are not restricted to the case in which the cornea and the back surface of the contact lens are spherical. Rather, the true corneal and lens curvatures may be used to calculate the scale parameter α as a ratio between the lens and the corneal radius of curvature. In the general case, the scale parameter will be a function of θ, i.e., $\alpha=R_b(\theta)/R_a(\theta)=\alpha(\theta)$.

The mapping transformation discussed above may be generalized to the case of three dimensional transformation. In such a case, the corneal elevations may be represented by a function, $f(\theta,\phi)$ where θ and φ represent the azimuth and elevation angle, respectively. The original elevation data is scaled up from the radius of curvature $R_a(\theta,\phi)$ using the following transformation relationship:

$$f^{(1)}(\theta,\phi)=\alpha f(\theta,\phi)$$

where $\alpha=R_b(\theta,\phi)/R_a(\theta,\phi)$.

To obtain a desired back surface of the lens, the functional $f^{(1)}(\theta,\phi)$ is scaled back down. However, in the three dimensional case, there are a number of options to choose from in performing the scaling operation such that the area is preserved. For example, if it is assumed that the deformation of the material is uniformly radial, the scaling mat be performed by scaling the elevation angle only, leaving the original azimuth angle. This is expressed in the following relationship:

$$f^{(2)}(\theta,\phi)=\alpha^{-1}f^{(1)}[\theta,(\phi-\pi/2)/\alpha+\pi/2]+R_b(1-1/\alpha)$$

Once the molding surface is deformed to the desired shape, the surface may be used to mold the desired lens. Therefore, in another embodiment, the invention provides a process for manufacturing an ophthalmic lens comprising, consisting essentially of, and consisting of the steps of: a.) providing a mold, at least one half of the mold comprising, consisting essentially of and consisting of (i.) a non-molding surface and a molding surface, wherein at least a portion of the molding surface is capable of being reversibly deformed and (ii.) adjustment means for reversibly deforming the deformable portion of the molding surface; b.) deforming the deformable portion of the molding surface to a shape suitable for imparting one or more optical characteristics onto a lens surface; c.) depositing a lens-forming material on the molding surface mold; and d.) curing the lens-forming material under conditions suitable to form the ophthalmic lens.

Lens-forming material may be deposited on the molding surface by any suitable means. The volume of lens-forming material dispensed into the cavity will be a lens forming amount which is an amount effective to form the desired ophthalmic lens. Typically, the amount of material deposited used will be about 0.01 mg to about 100 g.

The lens-forming material may be any material suitable for forming an ophthalmic lens. Exemplary spectacle lens-forming materials include, without limitation, polycarbonates, such as bisphenol A polycarbonates, allyl diglycol carbonates, such as diethylene glycol bisallyl carbonate (CR-39™), allylic esters, such as triallyl cyanurate, triallyl phosphate and triallyl citrate, acrylic esters, acrylates, methacrylates, such as methyl- ethyl- and butyl methacrylates and acrylates, styrenics, polyesters, and the like and combinations thereof. Additionally, the lens forming material may be one or more of the phosphine oxides disclosed in U.S. Pat. No. 6,008,299 incorporated herein in its entirety by reference.

Suitable lens-forming materials for contact lenses are any materials useful for forming hard or soft contact lenses. Preferably, the lens-forming material is suitable for forming a soft contact lens. Illustrative materials for formation of soft contact lenses include, without limitation silicone elastomers, silicone-containing macromers including, without limitation, those disclosed in U.S. Pat. Nos. 5,371,147, 5,314,960, and 5,057,578 incorporated in their entireties herein by reference, hydrogels, silicone-containing hydrogels, and the like and combinations thereof. More preferably, the surface is a siloxane, or contains a siloxane functionality, including, without limitation, polydimethyl siloxane macromers, methacryloxypropyl polyalkyl siloxanes, and mixtures thereof, silicone hydrogel or a hydrogel, such as etafilcon A.

Suitable materials for forming intraocular lenses include, without limitation, polymethyl methacrylate, hydroxyethyl methacrylate, inert clear plastics, silicone-based polymers, and the like and combinations thereof.

Curing of the lens forming material deposited within the mold may be carried out by any means known including, without limitation, thermal, irradiation, chemical, electromagnetic radiation curing and the like and combinations thereof. Preferably, molding is carried out using ultraviolet light or using the full spectrum of visible light.

More specifically, the conditions suitable for curing the lens-forming material will depend on the material selected and the lens to be formed. For formation of spectacle lenses, a preferred curing condition is a two-stage UV cure in which the mold assembly is exposed to low intensity and then high intensity ultraviolet light. Low intensity UV light is UV light with an intensity of about 0.5 to about 50, preferably about 1 to about 5 mW/cm². High intensity UV light is of an intensity of about 50 to about 2000, preferably 500 to about 1500 mW/cm². The wavelengths at which the exposures are carried out may be, and preferably are, the same. Suitable wavelengths are about 300 to about 450, preferably about 360 to about 400 nm. The time for the low intensity exposure will depend on the lens-material selected, the type and amount of any initiator used, material viscosity and the nature of its reactive groups, and the intensity of the UV light. Subsequent to the termination of the low intensity exposure, the mold assembly is exposed to high intensity UV light under conditions suitable to complete through-cure of the lens-forming. The same factors determinative for low intensity exposure time are determinative for the high intensity exposure time. Both high and low intensity exposure may, and preferably are, carried out as single, continuous exposures. However, the exposures also may be carried out using alternating periods of UV exposure and non-exposure periods. The low and high intensity polymerization steps may be carried out at a temperature between about 10 to about 50° C. and atmospheric pressure, preferably at ambient temperature. The UV exposure may be used alone or in combination with heat.

Polymerization processes for contact lenses are well known. Suitable processes are disclosed in U.S. Pat. No. 5,540,410 incorporated herein in its entirety by reference. For formation of contact lenses, a preferred curing condition is to pre-cure the mold assembly using UV light with an intensity of about 2 to about 10 mW/cm². Following the pre-cure, the mold assembly is exposed to UV light of an intensity of about 0 to about 4.0 mW/cm². Suitable wavelengths are about 300 to about 500 nm. The time for the low intensity exposure will depend on the lens-material selected, the type and amount of any initiator used, material viscosity and the nature of its reactive groups, and the intensity of the UV light. Both precure and subsequent UV exposure may, and preferably are, carried out as single, continuous exposures. However, the exposures also may be carried out using alternating periods of UV exposure and non-exposure periods. The polymerization steps preferably is carried out at a temperature between about 40 to about 75° C. and atmospheric pressure preferably under a blanket of nitrogen gas. Total cure time is between about 300 to about 500 seconds.

Once the curing is completed and the formed lens is removed from the mold, the adjustment means may be manipulated so that the molding surface returns to its first shape or assumes another shape for use in molding of a lens of another prescription. Alternatively, in the case that the molding surface is a polymeric membrane, all or a portion of the molding surface first may be deformed by the adjustment means, heated to above the molding surface material's Tg, subsequently cooled, and then used in lens molding. The cooled molding surface may be removed from the adjustment means for use. Once molding is completed, the molding surface may be disposed of or, and preferably, reused by use of heat and the adjustment means to configure the surface to the original shape or another desired shape.

Figure 2:
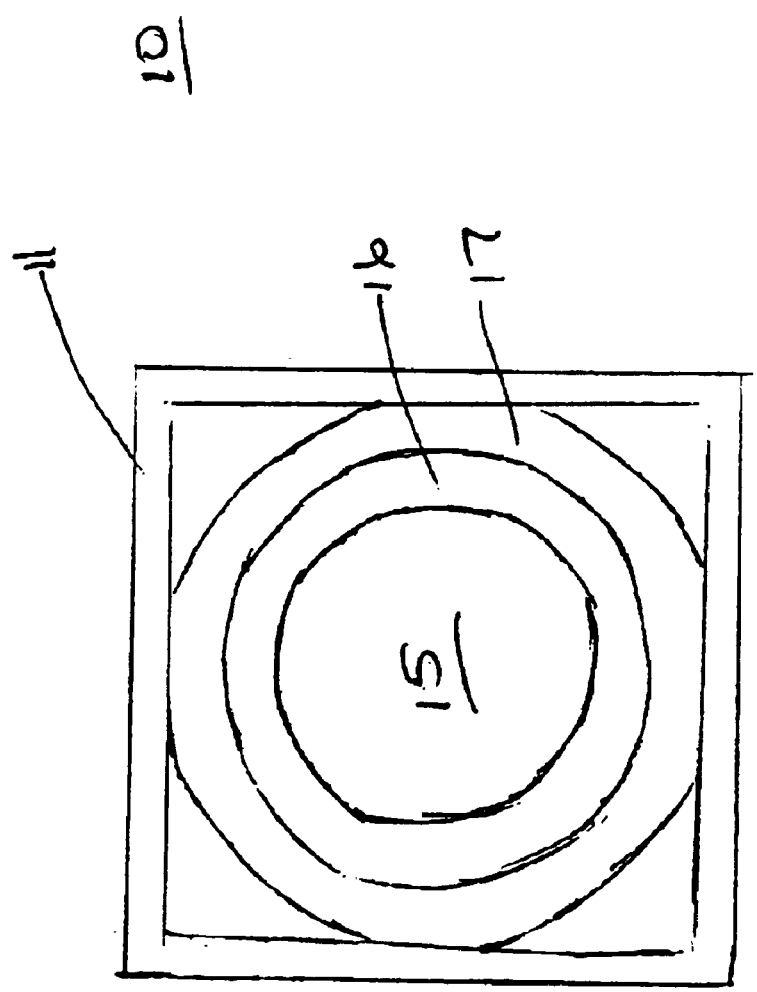
FIG. 2 is a top plan view of the mold half of FIG. 1.

In FIGS. 1 and 2 is depicted an exemplary mold half 10 of a mold of the invention having a concave molding surface 13 and convex non-molding surface 14. Enclosure 11 is shown supporting mold half 10. An array of micro-actuators 18 is shown contacting non-molding surface 14, which array acts as the adjustment means. Molding surface 13 has a portion 15 that is deformable and of a first shape of a radius of curvature $R_1$, which radius will change upon actuation of the adjustment means. Additionally, molding surface 13 has areas 16 and 17 each of a fixed radius of curvature. Area 16 is continuous with and extends around portion 15. Area 17 is continuous with and extends around area 16. The lens portions to be molded by areas 16 and 17 are those outside of the lenses optical zone. In an alternative embodiment, areas 16 and 17 also may have unfixed radii of curvature and be subject to the adjustment means. When the plurality of actuators 18 are actuated and contact non-molding surface 14, this causes the deformable portion 15 of molding surface 13 to be deformed to the desired shape.

The mold half shown in FIGS. 1 and 2 is a front mold half suitable for molding the front surface, or object side surface, of a lens. For purposes of molding a lens, a mold half complementary to mold half 10 is used. The molds of the invention may be composed of two mold halves, each of which has a deformable molding surface. Alternatively, one mold half may have a deformable mold surface and the other mold half may have a fixed molding surface. Suitable methods and materials for forming fixed molding surfaces are well known in the art. The mold halves may be brought into contact for purposes of molding the lens using any suitable contacting means including, without limitation, stepper motors, screw drives, or the like, and combinations thereof. When positioned for molding of the lens, the mold halves may contact one another. In this case, preferably a sealing means is used to seal the molds so that an acceptable lens edge is formed. Suitable sealing means include, without limitation, a gasket, o-ring, and the like, and combinations thereof. If the mold halves do not contact each other, preferably a mask is used to expose only those areas at which polymerization is desired The mold halves and molds of the invention may be supported by any suitable support means. Supporting means include, without limitation, a pallet, a support frame as shown in FIGS. 1 and 2, a case, or the like, and combinations thereof.

Figure 3:
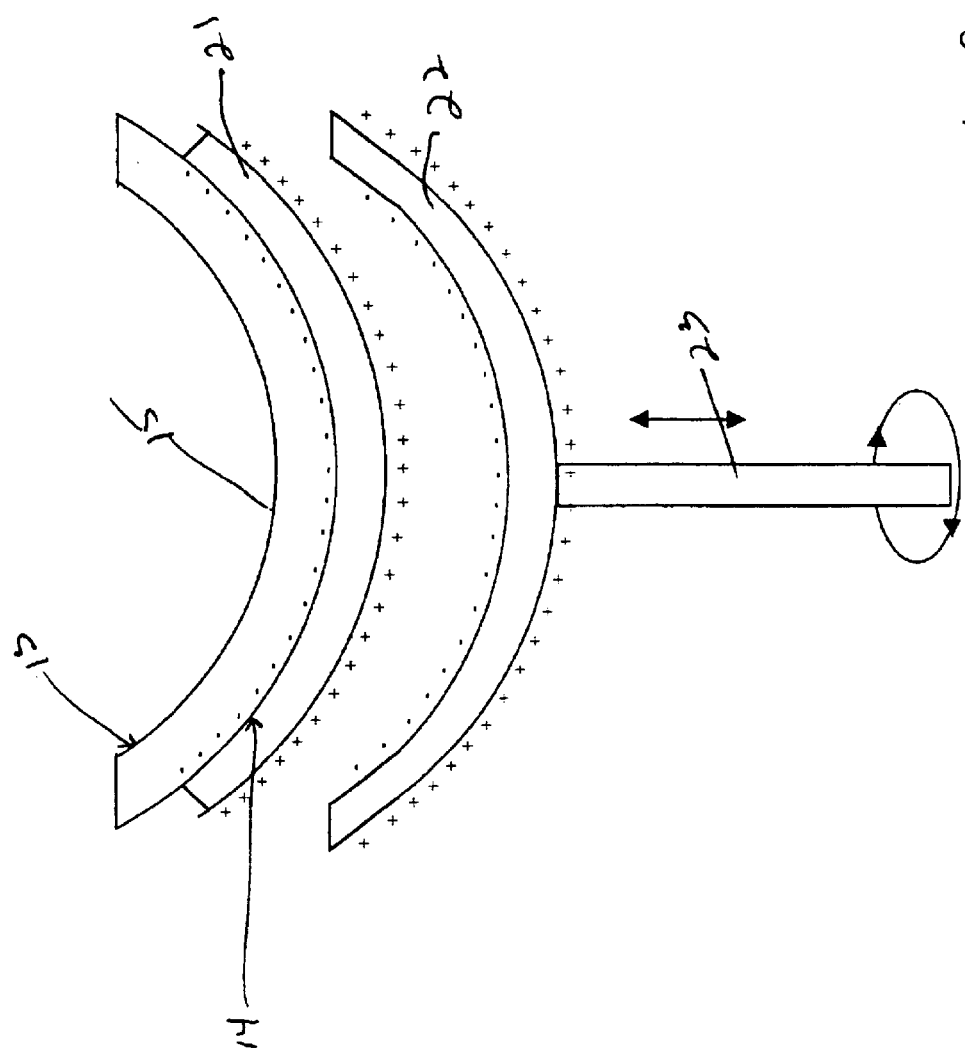
FIG. 3 is a magnified, cross-sectional view of a mold half of the invention.

In FIG. 3 is shown an alternative embodiment of the invention in which a the adjustment means is a magnetic field deformation means. Molding surface 13 has deformable portion 15. Non-molding surface 14 has in contact with it first magnetic material 21. Second magnetic material 22 is brought into proximity of first magnetic material 21 by mechanical arm 23, which arm is movably mounted so that it can be manipulated in the directions shown by the arrows. A magnetic force is exerted on material 21 by material 22 resulting in the deformation of material 21 and deformable molding surface 15.

Preferably, the molds of the invention are contained within a structure, such as a chamber, in which temperature, atmosphere, and pressure are controlled. Additionally, the enclosure will contain the source for curing of the lens material, such as a UV light source. Also preferably, a feed back mechanism, such as an interferomic technique, is used to feed information back to the adjustment means regarding the position and shape of the molding surface, the non-molding surface, or both.

Figure 4:
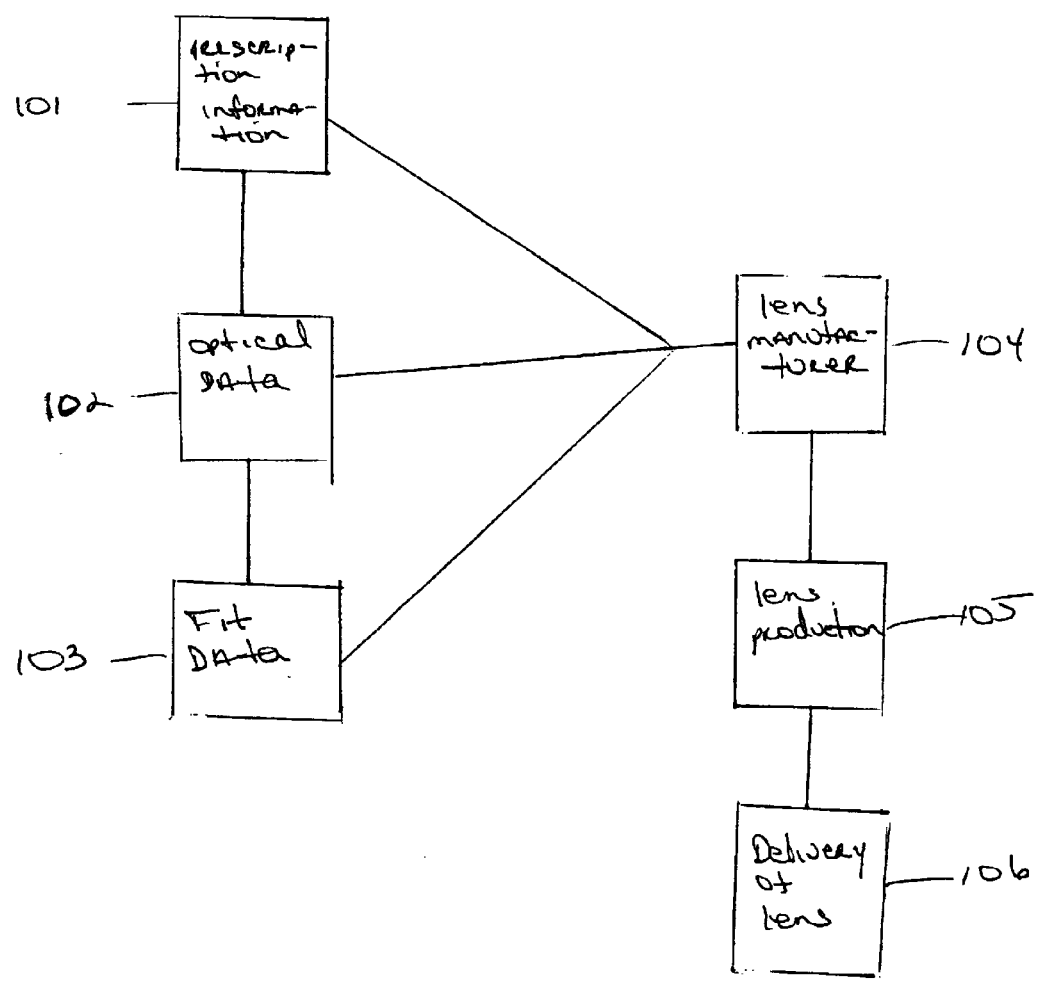
FIG. 4 is a flow diagram of a process using the mold of the invention.

The mold of the invention may be used to provide any ophthalmic lenses suitable to correct visual acuity defects. However, the molds of the invention may find particular utility in providing lenses customized to correct the aberrations, both low and high order, of a specific lens wearer. FIG. 4 is a flow diagram of a method for providing such lenses using the molds of the invention.

In step 101 of the method, a lens wearer's prescription information is determined. By "prescription information" is meant information necessary to correct the low order aberrations of the lens wearer. This information includes, without limitation, sphere, cylinder, axis, add power, and the like, and combinations thereof. The information may be obtained using conventional ocular measuring devices or, and preferably, by use of wavefront sensors. Optionally and preferably, in step 102, optical data is determined for the lens wearer. "Optical data" means measurement of higher order ocular aberrations. Such data is obtained using wavefront sensors. Finally, optionally and preferably, patient fit data is determined in step 103. For contact lenses, such data will include, without limitation, corneal topographic measurements of the lens wearer's cornea. For spectacle lenses, such information will include, without limitation, fitting height, distance zone pupillary distance, and the like, and combinations thereof.

The prescription information, optical data, and patient fit data (collectively, the "order information") is then sent to the lens manufacturer (104) by any convenient ordering means including, without limitation, telephone, facsimile transmission, internet website, and the like and combinations thereof. In a preferred embodiment, ordering is carried out via the lens manufacturer's internet website by the customer using any means capable of communicating with the lens manufacturer's server system (web server or web site). Suitable means for communicating with the website include, without limitation, a personal computer and modem. Thus, in yet another embodiment the invention provides a method for producing customized ophthalmic lenses comprising, consisting essentially of, and consisting of the steps of: a.) transmitting, by a customer using a computer system, to a lens manufacturer's server system lens order information; b.) manufacturing by the lens manufacturer the lenses using a mold for comprising, consisting essentially of, and consisting of i.) at least one mold half comprising, consisting essentially of and consisting of a non-molding surface and a molding surface, wherein at least a portion of the molding surface is capable of being reversibly deformed and ii.) adjustment means for reversibly deforming the deformable portion of the molding surface (105); and c.) delivering by the lens manufacturer directly to the customer the lenses (106).

In carrying out manufacturing of the lenses, the lens manufacture uses the order information, in whole or in part, to drive the adjustment means of the deformable molds of the invention to manufacture the wearer's lens. By "customer" is meant an orderer of spectacle lenses. Examples of lens orderers include, without limitation, ophthalmologists, optometrists, opticians, lens retailers, lens wearers, and the like. Preferably, the method of the invention is carried out so that it is a business-to-business system.

What is claimed is:

1. A mold for use in the manufacture of ophthalmic lenses comprising
   a.) at least one mold half comprising a non-molding surface and a molding surface, wherein at least a portion of the molding surface is capable of being reversibly deformed; and
   b.) adjustment means for reversibly deforming the deformable portion of the molding surface, wherein the adjustment means is selected from the group consisting of a mechanical magnetic field deformation means, a micro-actuator, and combinations thereof.

2. The lens of claim 1, wherein the molding surface comprises one of the group consisting of a metal, a polymer, a metalized polymer, and combinations thereof.

3. The mold of claim 1, wherein the molding surface comprises one of the group consisting of aluminum, gold, brass, nickel, and combinations thereof.

4. The mold of claim 1, wherein the molding surface comprises one of the group consisting of a polyolefin polymer, polyethylene terphthalate, a silicone polymer, an electro-active polymer, a shape-memory polymer, a ceramic, a shape-memory alloy, and combinations thereof.

5. The mold of claim 1, wherein the molding surface comprises polyolefin polymers.

6. The mold of claim 5, wherein the polyolefin polymer is polyethylene or polypropylene.

7. The mold of claim 1, wherein the deformable portion of the molding surface is a membrane.

8. The mold of claim 7, wherein the membrane if of a thickness of about 0.5 to about 5000 microns.

9. The mold of claim 1, wherein the adjustment means is a micro-actuator.

10. The mold of claim 9, wherein the micro-actuator is selected from the group consisting of a piezo-electric actuator, a micro-motorized actuator, a hydraulic micro-actuator, a magneto-restrictive micro-actuator, an electro-static micro-actuator, and combinations thereof.

11. The mold of claim 1, wherein the adjustment means comprises a mechanical magnetic field deformation means.

12. The mold of claim 11, wherein the deformation means comprises a first and a second magnetic surface.

13. A process for manufacturing an ophthalmic lens comprising the steps of:
   a.) providing a mold, at least one half of the mold comprising, consisting essentially of and consisting of (i.) a non-molding surface and a molding surface, wherein at least a portion of the molding surface is capable of being reversibly deformed and (ii.) adjustment means for reversibly deforming the deformable portion of the molding surface, wherein the adjustment means is selected from the group consisting of a mechanical magnetic field deformation means, a micro-actuator, and combinations thereof;
   b.) contacting the adjustment means with the non-molding surface in a manner to deform the deformable portion of the molding surface to a shape suitable for imparting one or more optical characteristics onto a lens surface;
   c.) depositing a lens-forming material on the molding surface mold; and
   d.) curing the lens-forming material under conditions suitable to form the ophthalmic lens.

14. The process of claim 13, wherein curing is carried out thermal cure, irradiation cure, chemical cure, electromagnetic radiation cure, or combinations thereof.

15. The method of claim 13, wherein curing is carried out using ultraviolet light.

16. A method for producing customized ophthalmic lenses comprising the steps of:
   a.) transmitting to a lens manufacturer lens order information wherein the information is one of corneal topographic measurements, low order ocular aberrations, high order ocular aberrations, or combinations thereof; and
   b.) manufacturing by the lens manufacturer the lenses using a mold for comprising, consisting essentially of, and consisting of i.) at least one mold half comprising, consisting essentially of and consisting of a non-molding surface and a molding surface, wherein at least a portion of the molding surface is capable of being reversibly deformed and ii.) adjustment means for reversibly deforming the deformable portion of the molding surface, wherein the adjustment means is selected from the group consisting of a mechanical magnetic field deformation means, a micro-actuator, and combinations thereof.

17. The method of claim 16, wherein transmitting is performed by a customer using a computer system and the information is transmitted to a lens manufacturer's server system.

18. The method of claim 16, further comprising the step of: c.) delivering by the lens manufacturer directly to the customer the lenses.

19. The method of claim 16, wherein the information is corneal topographic measurements, Zernike coefficients, or combinations thereof.

20. The method of claim 17, wherein the information is corneal topographic measurements, Zernike coefficients, or combinations thereof.

* * * * *